May 24, 1927.
M. E. NELSON
FISHHOOK EXTRACTOR
Filed April 28, 1926
1,629,583
FIG. 1.
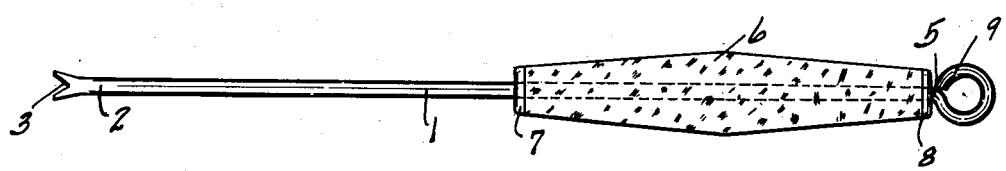
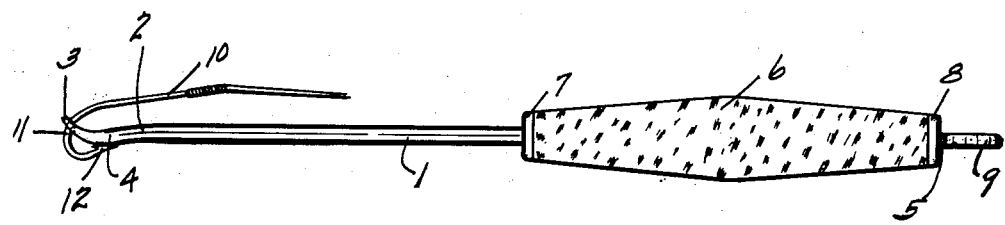
FIG. 2.
Inventor
Melven Edward Nelson
By Adam E. Fisher.
Attorney Patented May 24, 1927.

1,629,583

UNITED STATES PATENT OFFICE.

MELVEN EDWARD NELSON, OF FREMONT, NEBRASKA.

FISHHOOK EXTRACTOR.

Application filed April 28, 1926. Serial No. 105,075.

This invention relates to fish hook extractors and has for its object the provision of a simple and practical tool which rests in the curved portion of the fish hook and bears against the barbed point to prevent the said barbed point from lodging in the tissues of the mouth and throat of a fish while being extracted.

Other objects and advantages of the device will be apparent from the accompanying drawing and specification.

In the drawing

Figure 1 is a plan view of the extractor.

Figure 2 is a side view of the extractor in use.

In assembling the elements of my invention I provide a light substantial wire rod 1, having its forward end 2 flattened and forked as shown at 3. The said forward end 2 is formed with a slight curve 4 adjacent the forked portion 3 and in a plane opposite to that of the said forked portion 3 as clearly shown in Figure 2. Adjacent to the rear end 5 a handle 6 made of cork or other suitable material or substance is secured to the wire rod 1. The said handle 6 is provided with a metal cap 7 at one end which is secured to the wire 1 to prevent the said handle 6 from sliding toward the forward end 2. A cap or washer 8 is placed upon the opposite end of the handle 6 adjacent the rear end 5. After the said handle 6 is secured to the wire 1 the rear end 5 is formed into an eyelet 9 to permit carrying the device at the belt of the user. The cork handle is provided primarily to keep the extractor afloat in case it is dropped into the water.

In use the extractor is inserted into the fish's mouth and placed upon the fish hook 10 so that the forked portion 3 straddles the curved portion 11 of the said fish hook while the barbed point 12 is engaged by the curved portion 4. By drawing the fish line taut and giving the extractor a slight twist the hook 10 may be readily extracted by the aid of the said extractor.

While I have herein described a certain specific method of constructing and assembling the elements of my invention, it is understood same may be varied in minor details, not departing from the spirit of my invention as defined in the appended claim.

I claim:

A fish hook extractor, as described, comprising a wire rod, flattened and forked at the forward end; said forked end being slightly curved in a plane opposite to said flattened portion; a handle of a floatable material or substance, capped at both ends, on said wire rod, adjacent the rear end; and an eyelet formed in said rear end to permit securing said extractor to the body of the user.

In testimony whereof I affix my signature.

MELVEN EDWARD NELSON.